United States Patent
Chakra et al.

(10) Patent No.: US 10,339,186 B2
(45) Date of Patent: *Jul. 2, 2019

(54) INTERFACE FOR SIMULTANEOUS DISPLAY OF SELECTED ITEMS FROM SEARCH ENGINE RESULTS

(71) Applicant: International Business Machines Corporation, Armonk, NY (US)

(72) Inventors: Al Chakra, Apex, NC (US); Saurabh Gupta, Morrisville, NC (US); James Y. McVea, Jr., Chapel Hill, NC (US); Sandeep Perumbuduri, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1019 days.

This patent is subject to a terminal disclaimer.

(21) Appl. No.: 14/644,778

(22) Filed: Mar. 11, 2015

(65) Prior Publication Data

US 2016/0034580 A1 Feb. 4, 2016

Related U.S. Application Data

(63) Continuation of application No. 14/448,464, filed on Jul. 31, 2014.

(51) Int. Cl.
*G06F 17/30* (2006.01)
*G06F 7/00* (2006.01)
*G06F 16/951* (2019.01)

(52) U.S. Cl.
CPC .................. *G06F 16/951* (2019.01)

(58) Field of Classification Search
CPC .................................. G06F 17/30536
See application file for complete search history.

(56) References Cited

U.S. PATENT DOCUMENTS

| 5,982,369 A | 11/1999 | Sciammarella et al. |
| 6,144,991 A * | 11/2000 | England ................ H04L 29/06 |
| | | 709/205 |

(Continued)

FOREIGN PATENT DOCUMENTS

| KR | 20000036656 | 7/2000 |
| KR | 20040006515 | 1/2004 |

(Continued)

OTHER PUBLICATIONS

List of IBM Patents or Patent Applications Treated as Related, Mar. 27, 2015.

*Primary Examiner* — Pavan Mamillapalli
(74) *Attorney, Agent, or Firm* — Joseph Petrokaitis; POU IPLaw

(57) ABSTRACT

According to one embodiment of the present invention, a system for processing a search of network sites allows a user to view search results in at least one viewing mode. Each viewing mode allows a user to view multiple result pages, or portions thereof, such that user can browse multiple search results with minimal web navigation. Moreover, the system may allow a user to cull or trim search results while moving between viewing modes with minimal web navigation. In some embodiments, information relating to or included on a result page may be shown as the user culls the search results and progresses through the various viewing modes.

14 Claims, 5 Drawing Sheets

(56) References Cited

U.S. PATENT DOCUMENTS

| | | | |
|---|---|---|---|
| 6,166,736 A * | 12/2000 | Hugh | G06F 3/0481 715/777 |
| 6,366,299 B1 | 4/2002 | Lanning et al. | |
| 6,487,553 B1 * | 11/2002 | Emens | G06F 16/951 707/E17.141 |
| 7,099,861 B2 | 8/2006 | Youn | |
| 8,126,904 B1 * | 2/2012 | Bettinger | G06Q 10/06 707/758 |
| 8,214,380 B1 * | 7/2012 | Bettinger | G06F 16/9535 707/758 |
| 8,606,800 B2 | 12/2013 | Lagad et al. | |
| 8,825,636 B2 * | 9/2014 | Mach | G06F 16/957 707/722 |
| 9,305,088 B1 * | 4/2016 | Zamir | G06F 16/9535 |
| 9,877,086 B2 * | 1/2018 | Richardson | H04N 21/8549 |
| 2002/0124115 A1 * | 9/2002 | McLean | G06F 9/451 719/310 |
| 2003/0093405 A1 | 5/2003 | Mayer | |
| 2004/0216036 A1 | 10/2004 | Chu et al. | |
| 2005/0080795 A1 * | 4/2005 | Kapur | G06F 17/30705 |
| 2006/0085741 A1 | 4/2006 | Weiner et al. | |
| 2006/0100998 A1 | 5/2006 | Edwards et al. | |
| 2006/0129530 A1 | 6/2006 | Beavers et al. | |
| 2006/0265377 A1 * | 11/2006 | Raman | G06F 16/951 707/E17.108 |
| 2006/0277167 A1 | 12/2006 | Gross et al. | |
| 2007/0276811 A1 * | 11/2007 | Rosen | G06F 16/951 707/999.003 |
| 2008/0155426 A1 | 6/2008 | Robertson | |
| 2009/0300001 A1 * | 12/2009 | Mihara | G06Q 10/10 707/999.003 |
| 2012/0259827 A1 * | 10/2012 | Greene | G06F 16/168 707/706 |
| 2013/0019191 A1 * | 1/2013 | Arnold | G06F 3/04886 715/765 |
| 2013/0159923 A1 | 6/2013 | French et al. | |
| 2015/0339392 A1 * | 11/2015 | Reineck | G06F 16/9535 707/710 |

FOREIGN PATENT DOCUMENTS

| | | |
|---|---|---|
| KR | 20040048199 | 6/2004 |
| KR | 20040082275 | 9/2004 |
| WO | 2003060759 A2 | 7/2003 |
| WO | 2005076927 A3 | 8/2005 |
| WO | 2007137289 A3 | 11/2007 |
| WO | 2008080114 A1 | 7/2008 |

* cited by examiner

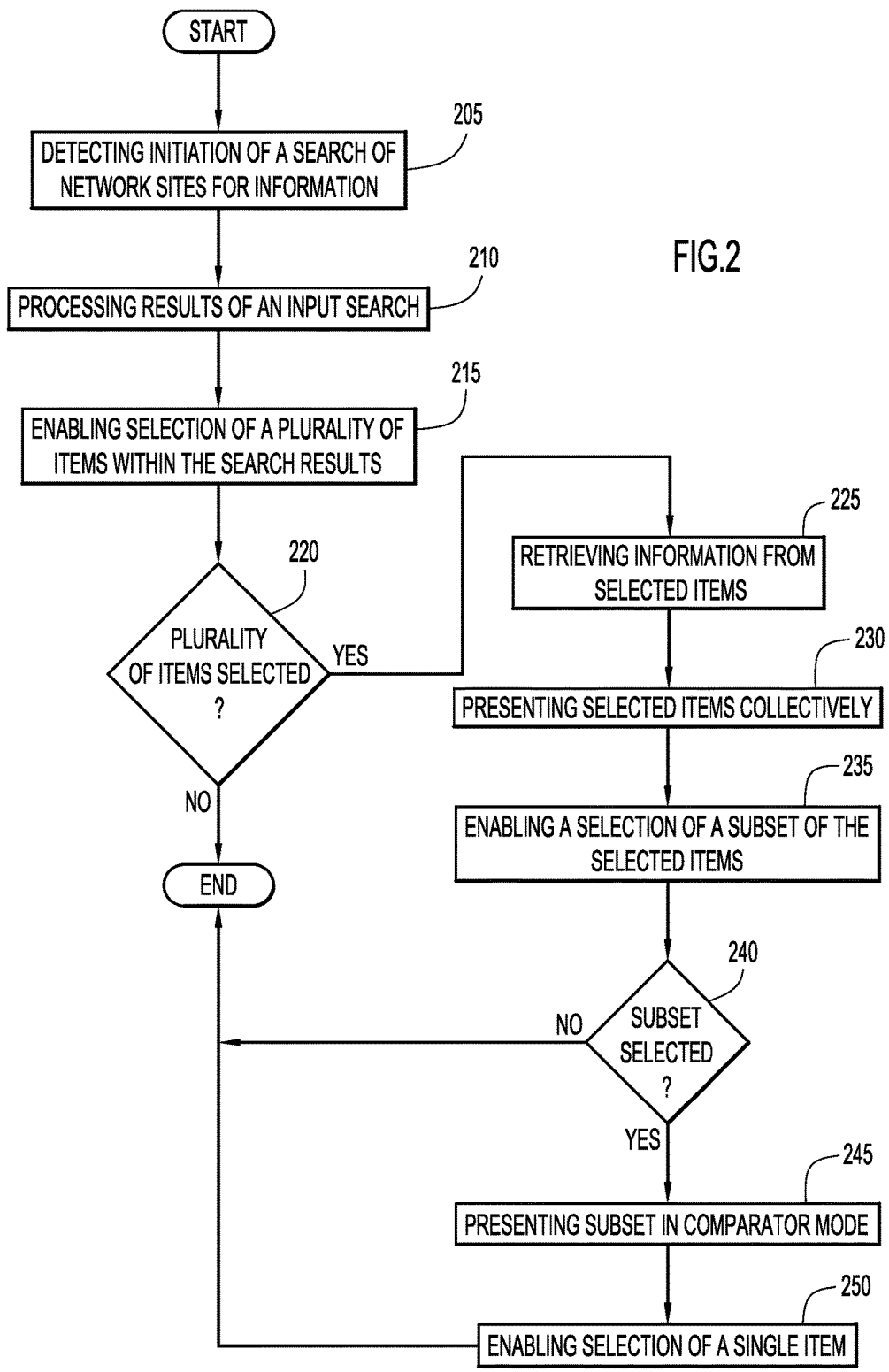

| computer architecture | SEARCH |

☑ computer architecture  Result 1
Description

☐ computer architecture  Result 2
Description

☑ computer architecture  Result 3
Description

☐ computer architecture  Result 4
Description

☑ computer architecture  Result 5
Description

☐ computer architecture  Result 6
Description

☑ computer architecture  Result 7
Description

☐ computer architecture  Result 8
Description

FIG.3

INTERFACE FOR SIMULTANEOUS DISPLAY OF SELECTED ITEMS FROM SEARCH ENGINE RESULTS

CROSS-REFERENCE TO RELATED APPLICATIONS

This application is a continuation of U.S. patent application Ser. No. 14/448,464, entitled "INTERFACE FOR SIMULTANEOUS DISPLAY OF SELECTED ITEMS FROM SEARCH ENGINE RESULTS" and filed Jul. 31, 2014, the disclosure of which is incorporated herein by reference in its entirety.

BACKGROUND

Present invention embodiments relate to network searching systems and more specifically, to a computer program product, a method and a system for simultaneously displaying selected items from search results produced by a search engine.

Web browsers are designed to allow a user to access remote web sites. In particular, web browsers are commonly used to access search engine sites, such as GOOGLE, MICROSOFT's BING, or YAHOO!, to search the internet for other sites relevant to keywords, questions, or other such queries entered by the user. Generally, web browsers treat search engine sites just like any other web site, insofar as the browser is responsible for rendering the HTML, images, JavaScript, and other resources' payload, while a search engine application at the remote site may be responsible for providing the payload and any back end application logic. Accordingly, a typical user experience is that a user enters one or more keywords or queries, submits these to the search engine, and, then, the user is presented with a long list of search results, possibly included over multiple pages. Once presented with the list of search results, a user typically clicks, one by one, on a search result link to view a result page. If the first result page isn't interesting or helpful to the user, the user may navigate back to the list of search results and select a second, different result link to view a second result page. This process of navigating back and forth between result pages and the results list is time-consuming and laborious.

In view of this, some search engines, such as BING and GOOGLE provide a single-page preview capability which allows a user to hover over a search page result link to see an in-page preview of the target of the link. However, in-page previews limit a user to viewing one page at a time and still require a user to navigate back and forth between a result page and a search list in order to fully determine if a result page might be interesting.

SUMMARY

According to one embodiment of the present invention, a system for processing a search of network sites is disclosed. The system includes at least one processor and is configured to process a search of network sites. Processing a search of a network of sites includes detecting initiation of a search of network sites for information. After detection, the results of the detected search may be processed and a selection of a plurality of items within the search results may be enabled. The items are associated with network sites that contain the information, where the information from each of the network sites associated with the plurality of selected items may be collectively presented after it is retrieved.

Embodiments of the present invention further include a method and computer program product for processing a search of network sites in substantially the same manners described above.

BRIEF DESCRIPTION OF THE SEVERAL VIEWS OF THE DRAWINGS

Generally, like reference numerals in the various figures are utilized to designate like components.

FIG. 2 is a flow diagram illustrating an example manner of processing a search according to an embodiment of the present invention.

FIG. 3 shows a screen shot of an exemplary viewing mode according to an embodiment of the present invention.

DETAILED DESCRIPTION

Present invention embodiments relate to a method, system and computer program product for an interface providing simultaneous display of selected items from search results. For example, in one embodiment, a system may present previews of a selection of search results and allow a user to search within the previews.

Figure 1:
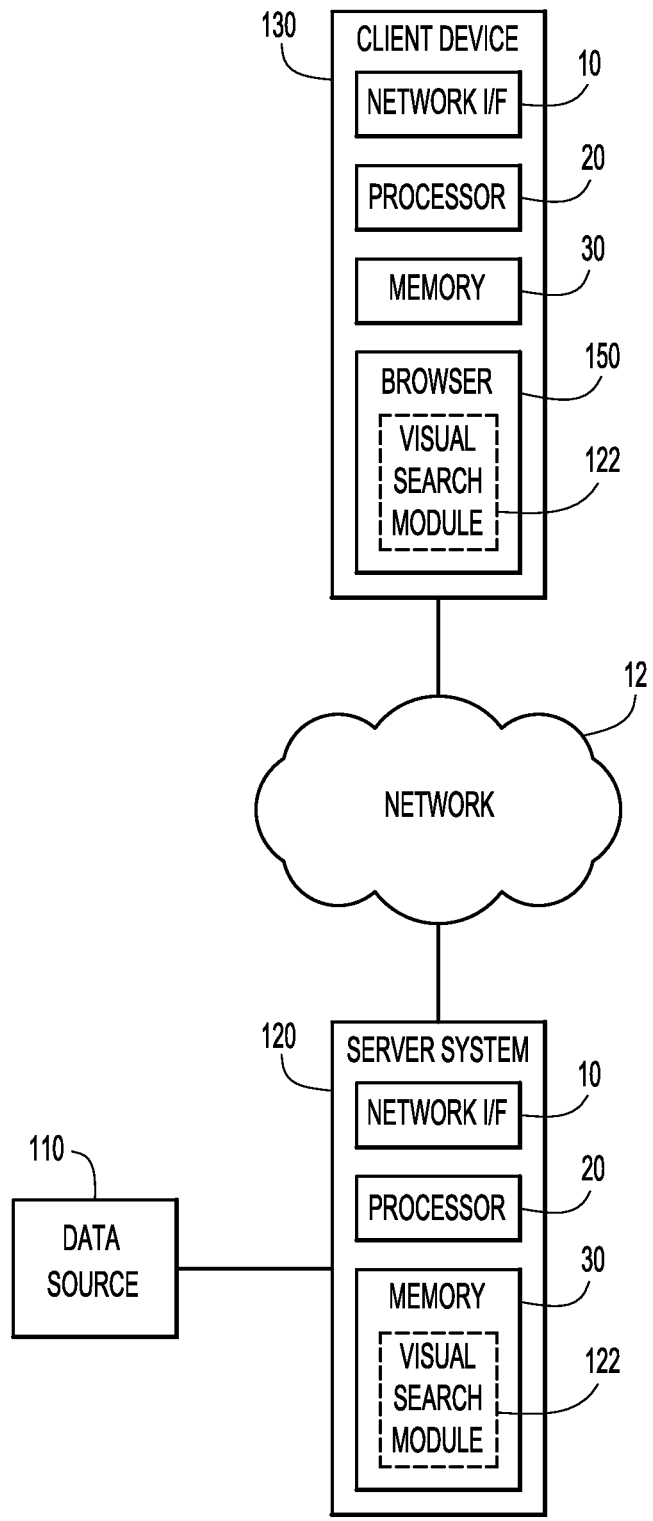
FIG. 1 is a diagrammatic illustration of an example environment for an embodiment of the present invention.

An example environment for present invention embodiments is illustrated in FIG. 1. Specifically, the environment includes one or more data sources 110, one or more server systems 120, and one or more client or end-user systems 130. Data sources 110, server systems 120, and client systems 130 may be remote from each other and communicate over a network 12. Network 12 may be implemented by any number of any suitable communications media (e.g., wide area network (WAN), local area network (LAN), Internet, intranet, etc.). Alternatively, any number of data sources 110, server systems 120, and/or client systems 130 may be local to each other, and communicate via any appropriate local communication medium (e.g., local area network (LAN), hardwire, wireless link, intranet, etc.). A data source 110 may be implemented by any conventional information storage system (e.g., database, file system server, etc.).

A server system 120 may include a visual search module 122. The visual search module 122 may be implemented across plural server systems. Alternatively, the visual search module 122 may reside on a client system 130 for use with a browser 150 or other interface of the client system. Client systems 130 enable users to communicate with the server system 120 (e.g., via network 12). The client systems may present any graphical user interface (e.g., GUI, etc.) or other interface (e.g., command line prompts, menu screens, etc.) to receive commands from users and interact with the visual search module 122 and/or other modules or services.

Server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software.

The visual search module 122 may include one or more modules or units to perform the various functions of present invention embodiments described below. The various modules (e.g. visual search module 122) may be implemented by any combination of any quantity of software and/or hardware modules or units, and/or may reside within memory 30 of a server system and/or client systems for execution by processor 20.

A manner of processing searching of network sites (e.g. via visual search module 122, server system 120 and/or client system 130) via an interface according to an embodiment of the present invention is illustrated in FIG. 2. Generally, the interface provides search results in at least one viewing mode. Each viewing mode allows a user to view multiple result pages, or portions thereof, such that user can browse multiple search results with minimal web navigation. Moreover, the interface may allow a user to cull or trim search results while moving between viewing modes. In some embodiments, information relating to or included on a result page may be shown as the user culls the search results and progresses through the various viewing modes.

More specifically, and as shown in FIG. 2, searching may be begin upon detection of the initiation of a search of network sites for information at step 205 (e.g., when a search engine is opened in a browser 150 and utilized to search for relevant web pages or information). In some embodiments, properties defining a search engine may be stored in memory and if these properties are found to be present, it may be determined that a search engine has been initiated and open in the browser. However, in other embodiments, initiation of a search engine may be detected in any desirable manner.

Regardless of how initiation of a search engine is detected at step 205, once detected, the results of an input search query may be processed at step 210. Preferably, the results may be processed by the detected search engine such that search engine provides a list of results. However, after the search results are processed at step 210, a user may be enabled to make a selection of at least one item within the search results at step 215. For example, each search result item may include or be made to include a check-box, selection item, or other such item that allows a user to indicate whether a certain result should be selected. In some embodiments, checkable boxes included adjacent the search result link that is generally provided to a user by a search engine enable a user to select search result items from the search results list. Preferably, the pages provided by the search engine are modified to provide the check boxes or other selection mechanisms. Regardless of how this is accomplished, a user may select any number of search results to review in further detail. The viewing mode which allows a user to select a number of search results may be referred to as initial selection mode.

In some embodiments, a user may make a number of selections over multiple pages of search results. For example, if a user inputs a search query into GOOGLE, a user may select three search results (perhaps by checking a box adjacent each search result) on the first page of search results (e.g. the first ten to twenty results presented to a user), three search results on the second page of search results, and so forth, and all of the selected search results may be collectively stored so that all of the results may reviewed later. Additionally or alternatively, a user may select search results over a number of different search engines within the same browser. For example, if a user searches a first search term, such as "computer architecture" in GOOGLE within a first tab of INTERNET EXPLORER and then searches "network architecture" in BING within a second tab of INTERNET EXPLORER, the user may select search results from both the BING results and the GOOGLE results (including results from multiple pages of each of these searches).

At step 220, it may be determined whether the user has selected a plurality of items within the search results (e.g. the user has checked a plurality of search result pages). If the user has not selected a plurality of items and, instead, has only selected a single search result, the user may simply be redirected to the web page associated with the single search result. However, if the user has selected a plurality of items (including across different search engines or across multiple pages of search results), information from or relating to the selected items may be retrieved at step 225 and, then, information relating to the selected items may be collectively presented at step 230. In some embodiments, a user may click a button, such as a "Display Snapshot" button, to trigger the collective presentation at step 230, but in other embodiments the collective presentation provided at step 230 may be triggered automatically in accordance with any desirable criteria or threshold, such as once a certain number of items are selected.

Figure 4:
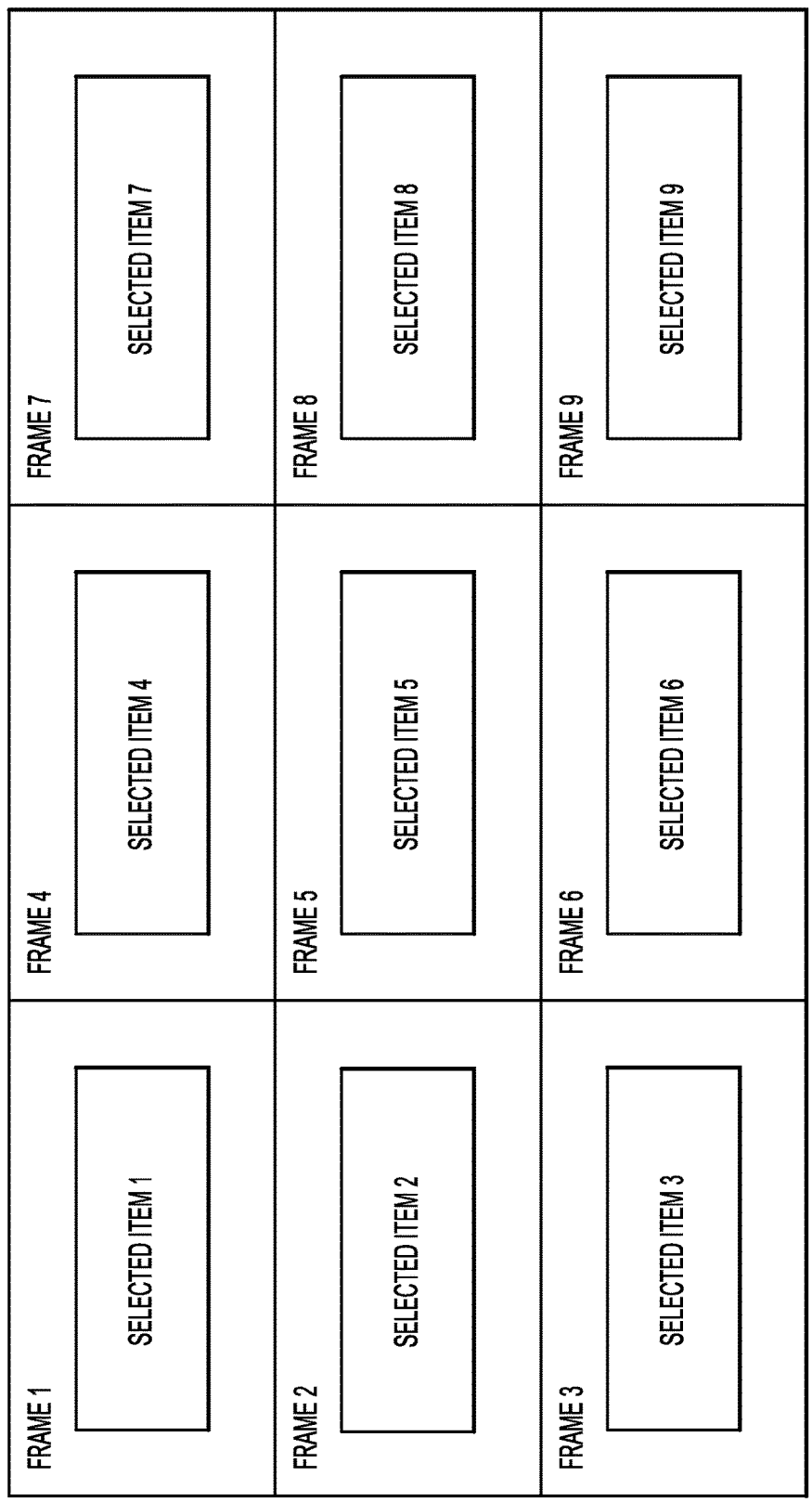
FIG. 4 shows a screen shot of a second exemplary viewing mode according to an embodiment of the present invention.

At step 230, a snapshot of each of the web pages of the selected items is collectively presented. This view may be referred to herein as snapshot mode, snapshot viewing mode, or some variation thereof. In some embodiments, the information retrieved at step 225 simply enables a live page to be displayed at step 230, but in other embodiments, a screen shot, a portion of the live page, or any other desirable information or view may be provided at step 230. As shown in FIG. 4, in some embodiments, each snapshot shown in snapshot mode may be shown in a frame or window (which are used interchangeably herein) and the frames may be arranged into a grid, such as a three by three grid, so that a user may view multiple web pages at once in order to determine the relevance of those pages.

In some embodiments, a user may predefine how many snapshot windows or frames are shown at once, but in other embodiments, the number of snapshot windows to be shown may be determined, adjusted, and/or user-selected, in any desirable manner. Moreover, in some embodiments, each snapshot may be substantially the same size, however, in other embodiments, the size of each snapshot may depend on various factors, such as importance, ranking, or relevant keywords. For example, if a certain search result is determined to have three instances of the keyword that was initially input into the search engine, this result page may be provided in a window that is three times as large as the windows provided for search results with one instance of the same keyword (e.g. the larger window may be provided in a window sized to encompass the right third of the screen with six smaller windows provided in the remaining two-thirds).

Each of the snapshot windows may be selectable, markable, or otherwise configured to enable a user to identify a certain number of snapshot windows, at step 235, to review further. In other words, upon viewing the snapshot windows of the result pages at step 230, a user may, at step 235, select a subset of the items that were selected at step 215 in order to further trim the results to further investigate web pages of the selected items that the user has found relevant or useful thus far. In some embodiments, a user may simply click a snapshot window in order to select a certain snapshot window to be included in the subset of selected items.

However, in other embodiments, a user may check a box, mark a snapshot window in a certain manner, or indicate that a certain snapshot window should be included in the subset in any other desirable manner. Additionally, in order to allow a user to make an educated or informed decision, in some embodiments, each window may be scrollable, expandable, or otherwise manipulable or navigable. For example, in some embodiments, a user may scroll over or double click a particular snapshot window in order to cause the snapshot window to expand to a full screen window, thereby allowing a user to closely view the contents or information included in the snapshot window. In order to resize the window back to its original size, the user may simply perform the same action again (e.g., double click the window again).

Moreover, if a user selects a high number of search results at step 215, in some embodiments, only a certain number of search results may be shown at one time at step 230 to ensure that each snapshot is large enough for a user to see and analyze. In such embodiments, a user may select or deselect certain snapshot windows as relevant or irrelevant, at step 235, and the irrelevant snapshot windows may be removed and replaced with a selected result that was not previously shown. Initially, snapshot windows which are most relevant may be shown to the user. Relevance, for the purposes of determining which snapshot windows to show first, may be determined based on at least one of user preferences, number of keywords within each search result, the order by which the search results appear in the list of search results initially produced by a search engine, or any other desirable criteria or preference. For example, in some embodiments, a user may rank search results while selecting them in initial selection mode and snapshots of the highest ranked search results may be presented first when number of selected search results is too large to display at once.

As an example of how snapshot windows may be replaced, if a user initially selects eleven items from the search results provided by the search engine, nine snapshots (perhaps of the most relevant search results) may be initially shown and the snapshots of the remaining two items may be hidden. Then, if a user indicates that a certain search result is irrelevant or undesired (perhaps by clicking on that snapshot window), the irrelevant snapshot window may be replaced by one of the two snapshot windows that was initially hidden. This process may continue until the user has viewed all of the snapshot windows. Alternatively, in some embodiments, a user may indicate that a certain search result is relevant and, then, the relevant snapshot window may be stored for later viewing and replaced by one of the two snapshot windows that was initially hidden. In such embodiments, any relevant snapshot windows may be reshown to a user after the user has viewed all of the snapshot windows for the selected items.

Regardless of how the snapshot windows are shown, after all of the selected snapshot windows have been viewed at least once, a snapshot window may simply disappear (without being replaced) when a user indicates that it is irrelevant. In some embodiments, as snapshot windows are removed from the snapshot view, the remaining snapshot windows may be resized as desired, either automatically or manually (e.g. to cover the entire screen).

If a user selects a subset of items while in the snapshot viewing mode, this may be detected at step 240. If the user did not select a subset of results, the user may be directed to the web page of the only selected result or begin a new search in the search engine (e.g., if no items were selected). However, if the user has selected a subset, the selected subset may then be shown with more information, at step 245. In particular, the selected subset may then be shown in a comparator mode which may allow a user to compare the selected items in the subset with additional information, as compared to snapshot mode. For example, in some embodiments, comparator mode may provide two web pages of selected items side by side and the two web pages may be configured to be scrolled through independently and/or together, such as via a composite scroll bar. Thus, a user may begin to delve further into the web pages of the selected items, perhaps reading information included deeper within the web pages.

Additionally, in some embodiments, comparator mode may detect information included within any search results included in the subset, compare this information among the search results, and normalize this information so that it may be presented to the user for comparison, insofar as normalize simply implies that the detected information may be arranged so that similar categories of information are presented in the same place on multiple web pages. In other words, information included on a web page may be rearranged for normalization. Thus, in some embodiments, the comparator mode may provide a view which includes normalized data at the top of the view and a live web page below the normalized data. Accordingly, a user may be able to compare the selected items in the subset via normalized data and/or from viewing the live web page. In some embodiments, information to be normalized may be detected via keywords, natural language processing, and/or static comparison.

In some embodiments, comparator mode may simply present two search results side-by-side. However, in other embodiments, any desirable number of search results may be presented to the user at once in comparator mode. Alternatively, and similar to the method discussed above with regards to snapshot mode, in some embodiments, two results may be initially presented to the user and if the user selects a certain result to be removed, it may be replaced with another search result from the subset selected at step 240. Regardless of how many search results are presented to the user at step 245, the user may be enabled to make a single selection at step 250, perhaps by clicking a certain portion of the search result presented at step 245. Upon making this selection, the user may then be redirected to the selected web page.

Figure 5:
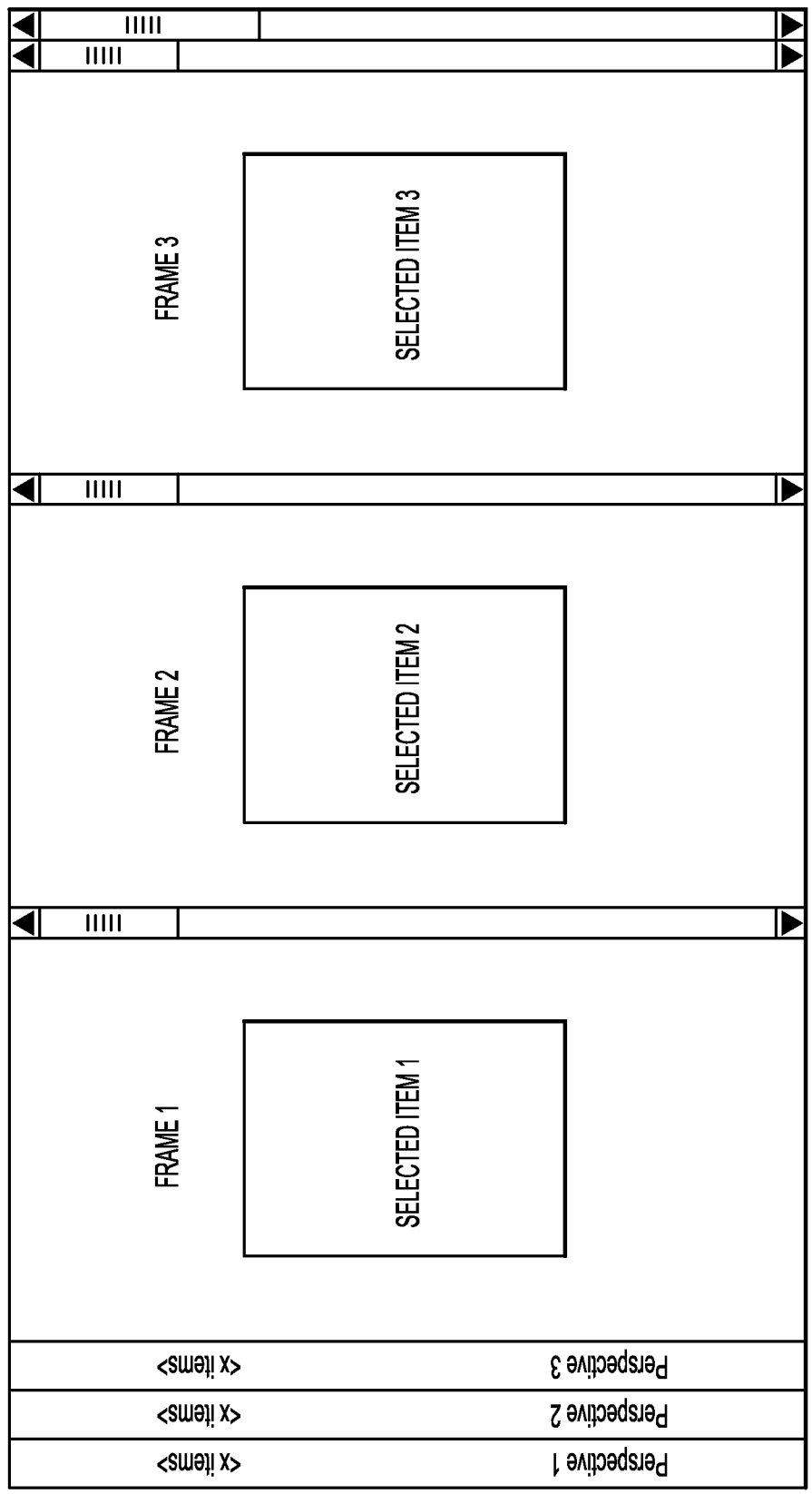
FIG. 5 shows a screen shot of a third exemplary viewing mode according to an embodiment of the present invention.

Now turning to FIGS. 3-5, screen shots of an exemplary embodiment of the interface are shown. FIG. 3 shows an exemplary view of the initial selection mode, FIG. 4 shows an exemplary view of the snapshot mode, and FIG. 5 shows an exemplary view of the comparator mode. As can be seen in FIG. 3, in initial selection mode a list of web pages may be shown to a user. In this particular embodiment (and in contrast with the lists that are generally provided by search engines) each of the web pages included in the list of web pages includes a check box to allow a user to select certain web pages. In the particular screen shot shown in FIG. 3, the first, third, fifth, and seventh results (as counted from the top) have been selected by a user.

Now turning to FIG. 4, one embodiment of snapshot mode is shown. As can be seen, in snapshot mode, previews of multiple web pages are provided at once. In this particular embodiment, each preview is shown within a frame that takes up a ninth of the overall screen size, but a user may also double click on any desirable frame in order to enlarge any particular frame. Additionally, as mentioned above, the size of each frame may be altered (either automatically or manually) in accordance with the number of snapshots shown or any other desirable criteria. As can be seen, each preview shows the images, text, or combination thereof, that are initially presented to a user upon navigation to its corresponding web site. In other words, each preview provides a snapshot of how a screen would appear immediately after a user clicked on a link.

As can be seen in FIG. 4-5, the snapshot windows are generally substantially smaller than the windows provided in comparator mode. In the embodiment shown in FIG. 5, comparator mode provides live versions of three web pages side-by-side. At the right edge of each live page is a scroll bar which allows a user to navigate each web page individually. Additionally, a fourth scroll bar is included at the right edge of the screen. The fourth scroll bar is a composite scroll bar and allows a user to scroll through all three web pages simultaneously. Although this particular embodiment of comparator mode does not include any normalized data, it is to be understood that comparator mode may include normalized data at the top of each live web page in other embodiments. In such embodiments, the normalized data may be frozen at the top of each web page or configured to move when a user scrolls through the page, as desired.

Additionally, although not shown in FIGS. 3-4, FIG. 5 also illustrates an exemplary navigation system that may allow a user to navigate between the different viewing modes. As can be seen at the leftmost edge, in some embodiments, each mode (initial selection mode, snapshot mode, and comparator mode) may have a tab or other such indicator that allows a user to quickly move between modes without navigating backwards or forwards in a browser.

As an example, if a user is in comparator mode but thinks that it may be beneficial to include additional results in his or her search, the user may click on the tab for initial selection mode and review and/or select more results found by the search engine. Upon selection of this tab, perhaps simply by clicking on it, the other two viewing modes may appear to slide to the right edge of the screen. Alternatively, in some embodiments, such as those embodiments implemented on touch screen devices, a user may actually slide a viewing mode to the right or left if desired. Sliding a viewing mode to the right may hide this view, revealing the view one step prior to the slid view (e.g. sliding comparator viewing mode to the right may reveal snapshot viewing mode) while sliding a certain view to the left may cause this view to be presented to the user. However, in other views, any desirable navigation method which allows a user to quickly move between viewing modes without navigating forwards or backwards in a browser may be implemented.

It will be appreciated that the embodiments described above and illustrated in the drawings represent only a few of the many ways of implementing embodiments for a system, method, and computer program for processing searches of network sites.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). Preferably, present invention embodiments may be included or incorporated into a browser via an extension or plug-in. The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The sources may be included within or coupled to the server and/or client systems. The sources and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, and may also be utilized for searching within a database, memory, etc., and may be triggered upon detection of any desirable search function.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of processing a search of network sites comprising:
   detecting initiation of a search of network sites for information by a search engine operating in conjunction with an Internet browser;
   processing results of the detected search and enabling selection of a plurality of items within the search results, wherein the items are associated with network sites containing the information;
   retrieving the information from each of the network sites associated with the plurality of selected items;
   generating a plurality of individually controllable frames each to receive and present on a display screen the retrieved information for a different corresponding selected item, wherein the display screen includes a common control to scroll each of the frames simultaneously;
   collectively displaying the retrieved information for the plurality of selected items in the plurality of frames;
   detecting available space on the display screen and sizing each frame based at least upon relevance of the selected item displayed in the frame to the search, a count of the plurality of selected items, and the available space on the display screen, wherein the plurality of frames enable the retrieved information for the plurality of selected items to be visible simultaneously on the display screen and indicate relevance of the selected items to the search based on frame sizes;
   normalizing the retrieved information of the corresponding different selected items to present related information at same locations within the plurality of frames; and
   in response to actuation of the common control of the display screen, simultaneously scrolling the retrieved information within each of the plurality of frames to concurrently traverse within each frame the retrieved information of the corresponding different selected item.

2. The computer-implemented method of claim 1, wherein collectively displaying the retrieved information includes:
   displaying the retrieved information for the plurality of selected items on a single page.

3. The computer-implemented method of claim 1, wherein collectively displaying the retrieved information includes:
   displaying the information for the plurality of selected items in respective frames, wherein the number of frames collectively displayed on a single page is user configurable.

4. The computer-implemented method of claim 1, wherein the plurality of selected items forms a first group of selected items from a collection of selected items, and collectively displaying the retrieved information further comprises:
   collectively displaying the first group of selected items in response to the collection of selected items exceeding a predetermined number of selected items for presentation; and
   replacing items from the first group with items from a second group as items from the first group are removed from the presentation.

5. The computer-implemented method of claim 4, wherein the selected items in the first group are determined based on an order of the network sites in the search results.

6. The computer-implemented method of claim 4, wherein the selected items in the first group are determined based on user preferences.

7. The computer-implemented method of claim 1, further comprising:
   enabling a selection of a subset of the plurality of items from the collectively displayed information.

8. The computer-implemented method of claim 7, wherein the retrieved information is collectively displayed in respective frames for a first presentation and the computer-implemented method further comprises:
   collectively displaying the subset of the plurality of items in a second presentation.

9. The computer-implemented method of claim 1, wherein enabling selection of a plurality of items within the search results further comprises:
   enabling the selection of a plurality of items within the search results of multiple search engines; and wherein collectively displaying the retrieved information further comprises:

collectively displaying the retrieved information for the plurality of selected items from the multiple different search engines in the plurality of frames.

10. The computer-implemented method of claim 1, wherein processing results of the detected search further comprises:

modifying each page from the search engine containing the search results to include a selection mechanism for each item in the search results to enable selection of the plurality of items.

11. The computer-implemented method of claim 1, wherein detecting initiation of a search further comprises:

executing a search by a plurality of different search engines within the Internet browser and detecting initiation of the search by each of the plurality of different search engines;

wherein processing results and enabling the selection of the plurality of items further comprises:

processing results of the detected searches and enabling the selection of the plurality of items from the search results of the plurality of different search engines in the Internet browser, wherein the search results of the plurality of different search engines are concurrently available for selection within the Internet browser, and wherein the plurality of selected items includes items from the search results of at least two different search engines; and wherein collectively displaying the retrieved information further comprises:

collectively displaying the retrieved information for the plurality of selected items from the plurality of different search engines in the plurality of frames.

12. The computer-implemented method of claim 11, wherein processing results of the detected searches and enabling selection of the plurality of items further comprises:

intercepting each page from the plurality of different search engines containing the search results; and modifying each intercepted page to insert a selection mechanism into that page for each item in the search results to enable selection of the plurality of items from the search results of the plurality of different search engines.

13. The computer-implemented method of claim 1, further comprising:

detecting removal of one or more of the plurality of frames; and in response to the detected removal of the one or more frames, automatically resizing remaining frames by detecting available space on the display screen and resizing each frame based at least upon relevance of the selected item displayed in the frame to the search, a count of the plurality of remaining selected items, and the available space on the display screen.

14. The computer-implemented method of claim 1, wherein each of the plurality of frames includes an individual control to scroll that frame, and the computer-implemented method further comprises:

scrolling a selected frame to traverse information of a selected item in response to manipulation of a corresponding individual control.

* * * * *